Jan. 26, 1965

C. O. DENNIS ETAL  3,166,787
APPARATUS FOR SUPPORTING, LOADING AND UNLOADING
TIRE RETREADING MATRICES

Filed Nov. 8, 1962

INVENTORS
Clement O. Dennis &
William C. Shaver

BY Mason, Fenwick & Lawrence
ATTORNEYS

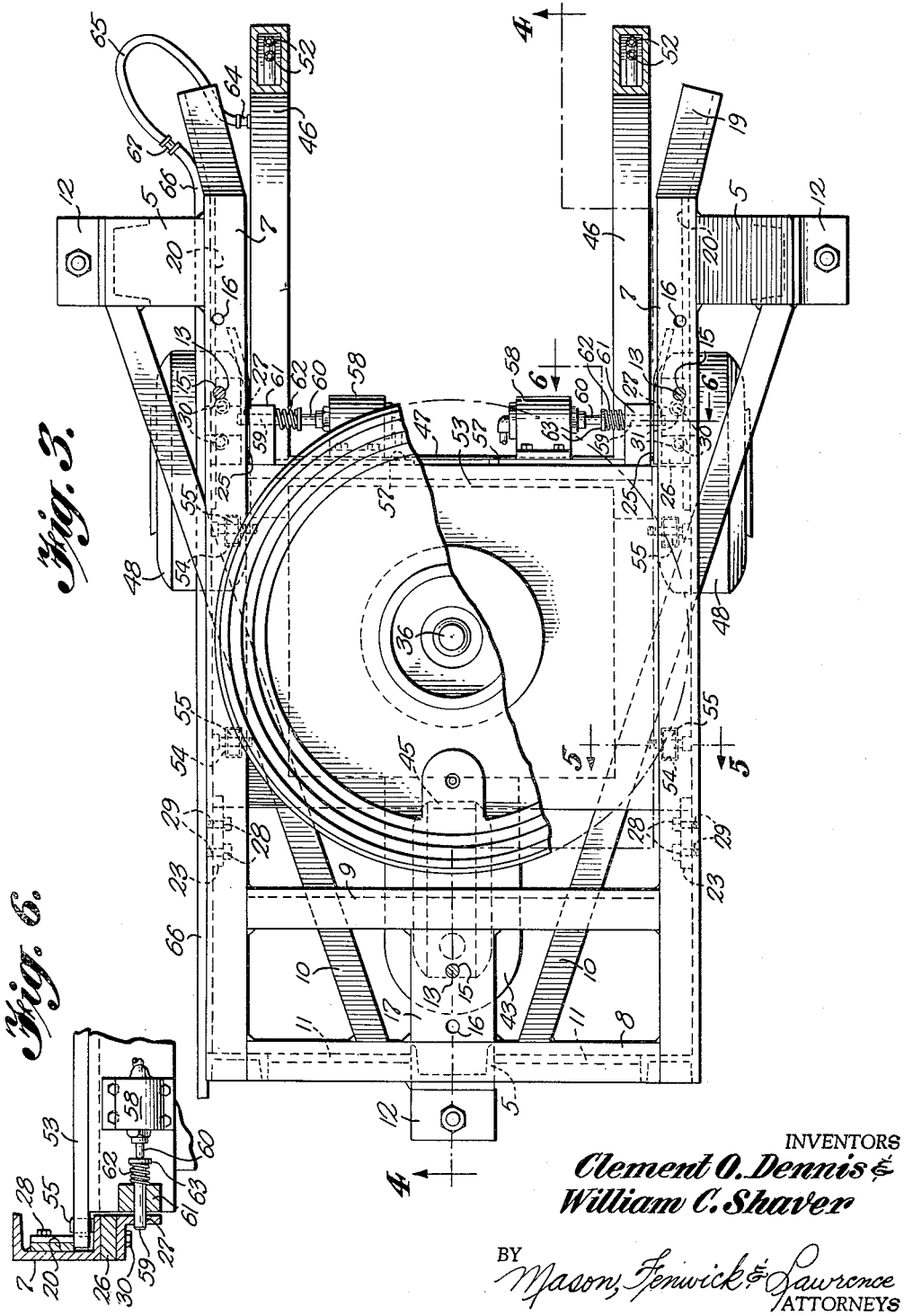

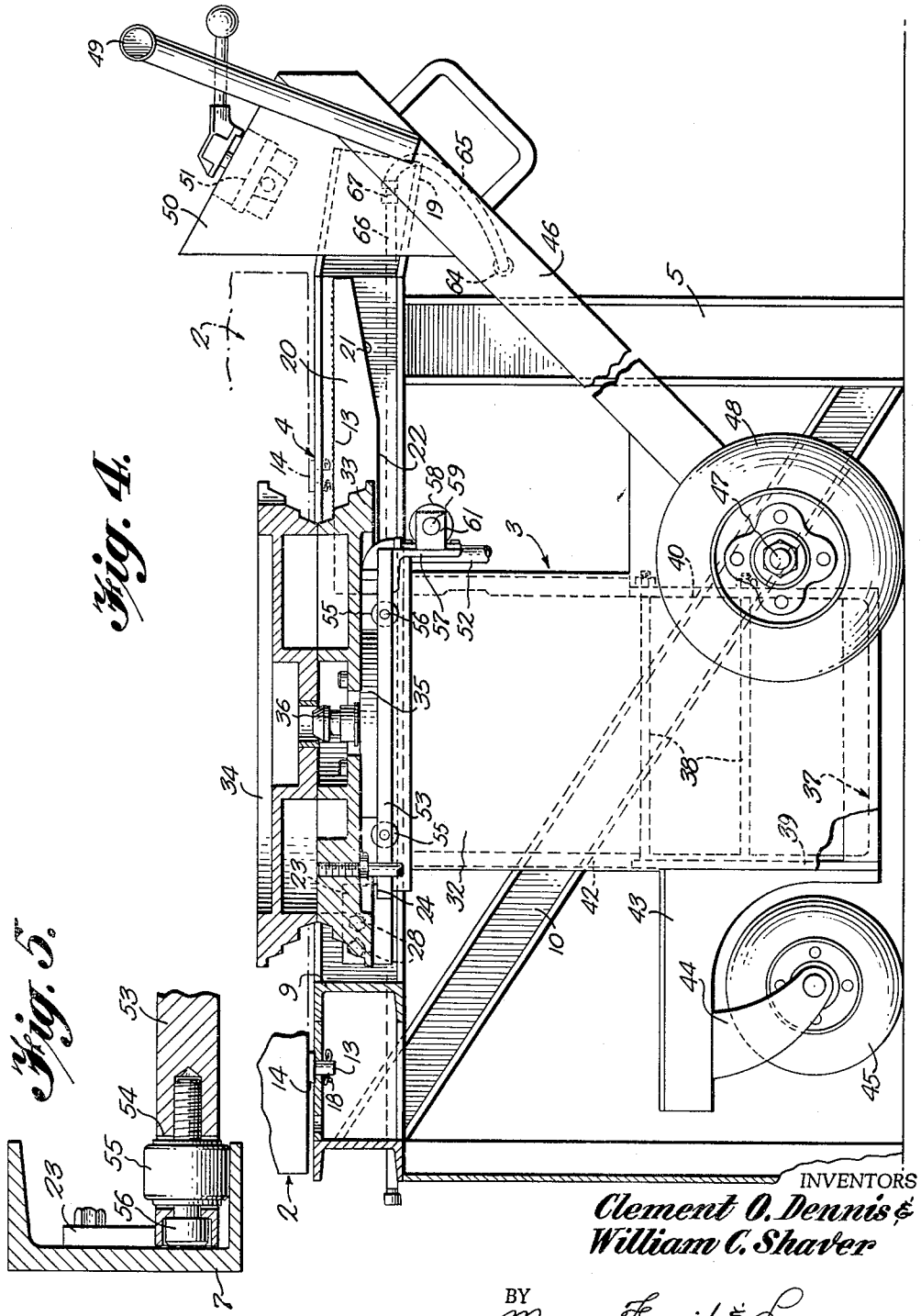

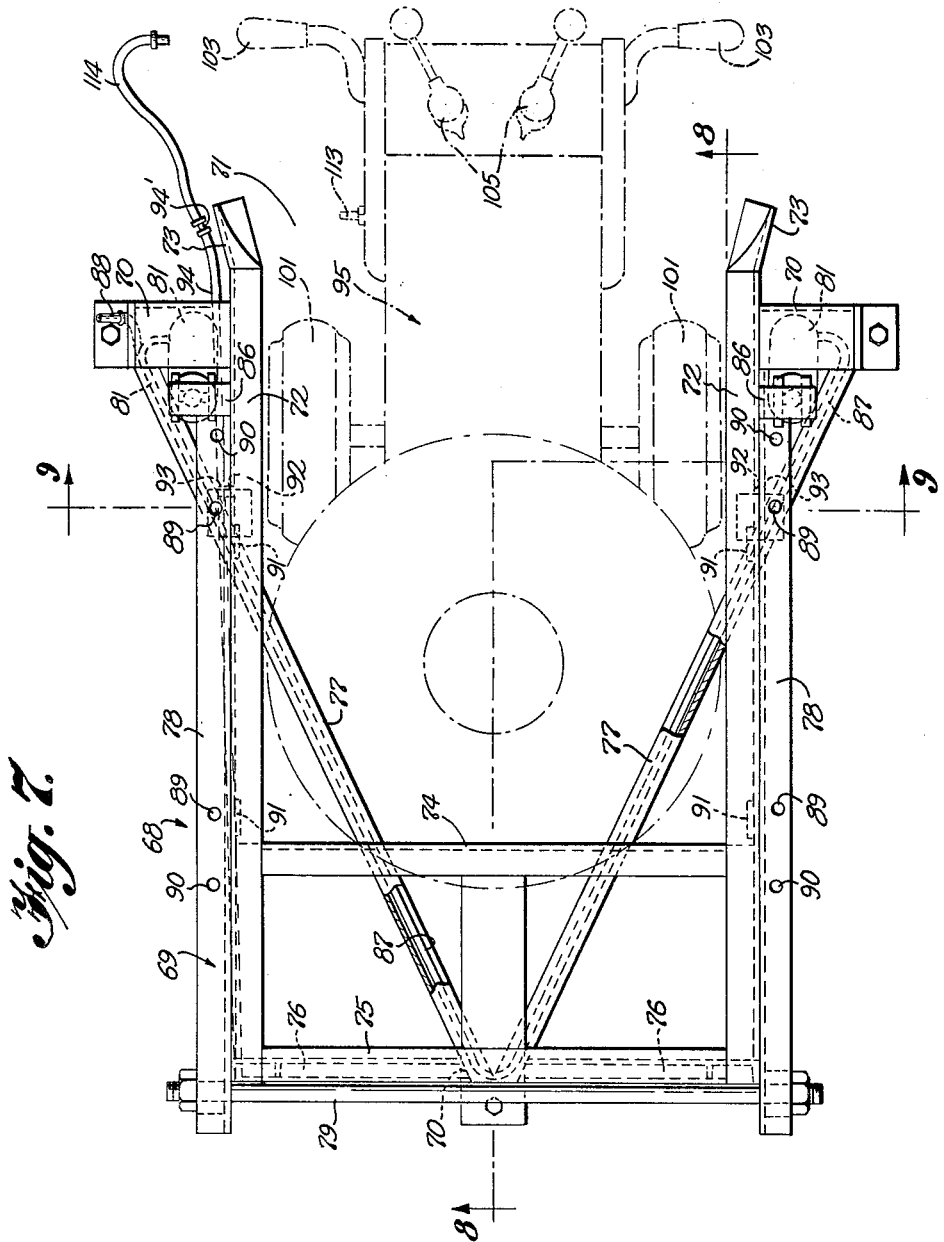

United States Patent Office 3,166,787
Patented Jan. 26, 1965

3,166,787
APPARATUS FOR SUPPORTING, LOADING AND
UNLOADING TIRE RETREADING MATRICES
Clement O. Dennis and William C. Shaver,
P.O. Box 1153, Macon, Ga.
Filed Nov. 8, 1962, Ser. No. 236,323
14 Claims. (Cl. 18—2)

This invention relates to apparatus for retreading tires, and particularly to improved means for supporting, loading and unloading retreading matrices.

Most present day tire retreading is done in press type equipment. The presses are very large and fairly complex machines, which are quite expensive to buy and costly to maintain. The matrices in which tires are retreaded are portable, being mounted on dollies, and movable from a curing station to the press for loading and unloading. It is necessary to disconnect the matrices from their source of heat in order to move them to the press and, consequently, there is an appreciable heat loss by reason of the interruption of heat application, as well as by heat loss to the massive press. This means that curing time is lengthened by a period equal to the time required to bring the matrix back to curing temperature.

Apparatus to overcome many of the disadvantages of the press system is disclosed in our co-pending application Serial No. 25,428, filed April 28, 1960, now Patent No. 3,067,457, entitled "Apparatus for Handling and Storing Tire Recapping Matrices." This application discloses a multi-shelf rack for matrices with an elevator for moving matrices on the shelves to and from a tire loader located on a track at the base of the rack. This equipment permitted loading and unloading the matrices without discontinuing heating and, therefore, overcame most of the problem of heat loss. This equipment, however, is adapted primarily for quantity operations and is not suited to the operator who has but two or three matrices.

The general object of the present invention is to provide simplified portable apparatus which can be adapted to retreading operations of any scale.

A more specific object of the invention is to provide such apparatus which includes a stand, or support, upon which a matrix will be held for continuous connection to a source of heat, and a portable loader that can be moved to the supported matrix to load tires therein or to remove them.

Another object of the invention is to provide apparatus of this kind in which the matrix stand has means to guide the loader into proper operative position relative to the matrix, and there will be means to hold the loader in fixed position relative to the stand.

A further object is the provision of retreading apparatus including a matrix stand and a portable loader wherein there are means on the stand to receive and completely support the portable loader, so that the two become an integral piece of equipment during loading and unloading of the matrix.

It is also an object of the invention to provide means on the matrix stand to lift the matrix to facilitate entry of the loader into the stand and then lower the matrix over the loader when the loader is in position.

Other objects of the invention will become apparent from the following description of practical embodiments thereof when taken in conjunction with the drawings which accompany, and form part of, this specification.

In the drawings:

FIGURE 3 is a top plan view of the apparatus showing the loader in place in the stand, parts being broken away to show detailed structure;

FIGURE 4 is a vertical section through the apparatus, taken on the line 4—4 of FIGURE 3;

FIGURE 5 is a detailed section showing on an enlarged scale the mounting of the rollers on the guide plate of the loader and is taken on the line 5—5 of FIGURE 3;

FIGURE 6 is a partial vertical transverse section taken on the line 6—6 of FIGURE 3;

FIGURE 7 is a top plan view similar to FIGURE 3 but showing apparatus particularly adapted for use in retreading truck type tires;

Figure 1:
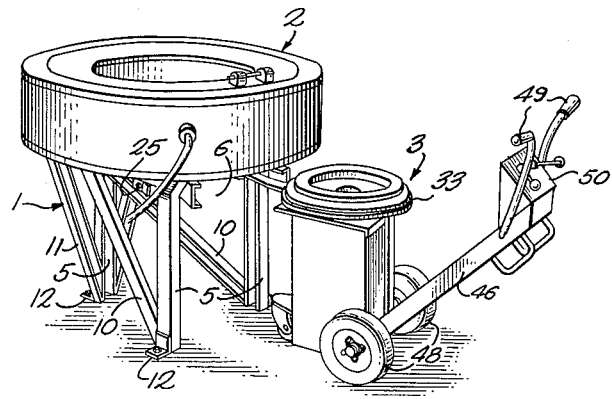
FIGURE 1 is a perspective view of apparatus embodying the principles of the present invention, the apparatus shown being particularly adapted for use in retreading passenger tires.
Figure 2:
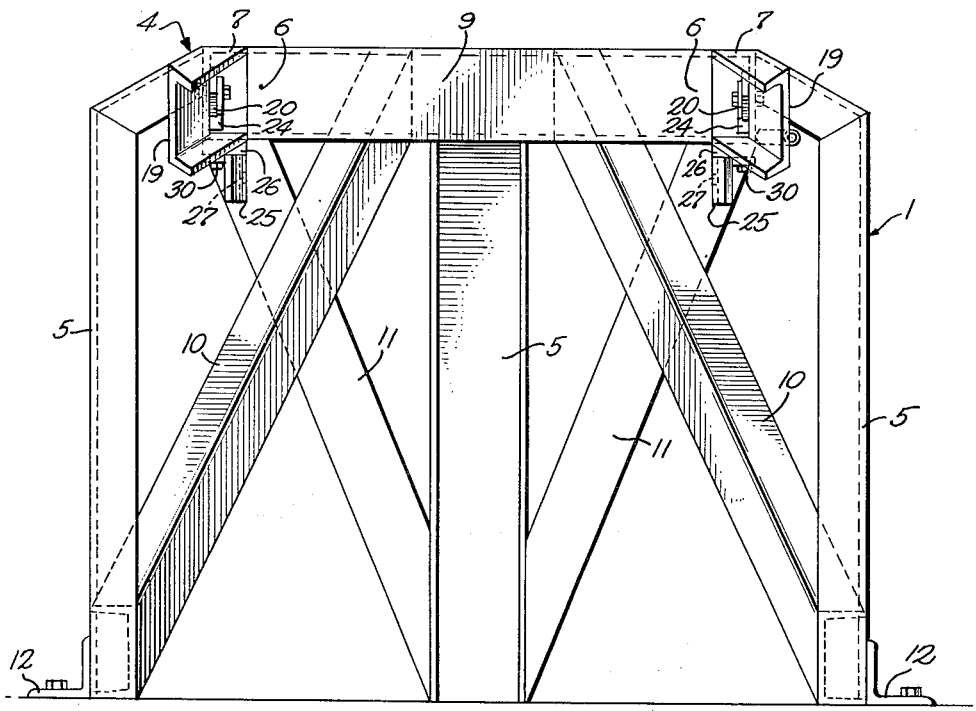
FIGURE 2 is a front view of the stand portion of the apparatus shown in FIGURE 1.

In general, the invention concerns tire retreading apparatus including two separable units, a matrix stand and a tire loader. The stand has means to guide the loader into proper position relative to a matrix supported on the stand, to fully support the loader off the floor and hold it rigidly locked against movement in any direction with respect to the stand. The matrix can remain connected to its source of heat during loading and unloading.

Referring to the drawings in detail, and first directing attention to that form of the invention shown in FIGURES 1 to 6, the apparatus consists of a stand 1 to support a retreading matrix 2, and a tire loader 3. While the stand and loader constitute a single apparatus for supporting, loading and unloading a tire matrix, the two are separable, and the loader is portable so that it may be removed from the stand for use with other matrices on other stands.

Stand 1 has a matrix supporting bed 4 mounted upon legs 5. The bed 4 is U-shaped, being open at the front 6 to permit entry of the loader. Bed 4 is composed of two channel members 7, arranged in spaced, parallel relation to form guide tracks for the loader, as will be described. The channels are bridged at the back by suitable connecting members 8 and 9 which, with the side channels, or track members 7, complete the U-shaped bed. Braces 10 interconnect the back member 8 and the front legs 5, and braces 11 interconnect the back members 8 and the rear leg 5 to stiffen the bed.

The legs 5 can be of any convenient form, and are located one at the center of the member 8 at the back and one under each track member for stability. Brackets 12 are fixed to the leg bottoms to allow the stand to be bolted to the floor.

A matrix 2 is mounted on the stand by means of studs 13 fixed to the underside of the matrix. The studs are provided with bushings 14 of "Teflon," or other suitable heat insulating material, to prevent heat loss from the matrix to the stand. The stand bed is provided with two sets of openings 15 and 16, to receive the studs. The openings will be symmetrically arranged on the bed, two in a strip 17 between the back members 8 and 9, and two in each channel, to receive studs located at different radial distances from the centers of matrices of different diameters, and will ensure accurate location of the matrix center with relation to the stand. Cotter pins 18, through studs 13, will fix the matrix to the stand.

The channels 7 will provide guide tracks for a portion of the loader, as will be described, and in order to lead the loader into the tracks, the tracks are provided with flared ends 19 which diverge outwardly at the open end of the stand and decline forwardly. Thus, the lead in ends 19 will provide inclined and converging entrance ways for the loader to lift the loader and center it relative to the stand.

Forward hold-down members 20 are fixed to the side walls of the track channels 7. These are plates, or strips, spaced from the bottom flanges of the channel tracks a sufficient distance to allow the free passage of the loader plate (to be described), yet hold the loader against vertical movement. The forward portion 21 of the lower edge of the hold-down members is inclined outwardly so as to lead the loader plate to the guide areas defined between the bottoms 22 of the hold-down members and the bottom flanges of the channels.

Near the back ends of the bed 4, channels 7 carry stop plates 23 which are fastened against the vertical walls of the channels. These serve to limit the movement of the loader into the stand and fix the loader position in the stand. Plates 23 have notches 24 at their forward lower corners to seat the front corners of the loader plate and hold down the loader front.

At each side of the bed 4, there is a lock plate 25, secured by bracket 26 to one of the channels 7. The plates have openings 27 to receive lock pins on the loader.

It will be noted that the stop plates 23 are secured to the channels by bolts 28 passing through openings 29 in the channels, and the lock plate 25 is fixed to its bracket by bolts 30 passing through openings 31 in the bracket 26. Openings 29 and 31 are all oversize, so that some adjustment may be made of the several plates to assure accuracy in positioning the loader with respect to the stand, and primarily with respect to the matrix which is precisely located relative to the stand.

The loader is essentially a device for holding a tire to be placed in a matrix, pressing the tire beads toward one another to reduce the tire diameter in order to clear the matrix flanges, and to lower a tire into a matrix and lift it therefrom. The loader has as its main element, an operating unit 32 housing a cylinder assembly, wherein one cylinder telescopes within another, which controls the movement of bead wheels 33 and 34. Lower bead wheel 33 is fixed to the top of the inner cylinder 35, and upper bead wheel 34 is removably connected to the piston rod 36 of the inner cylinder 35. For the details of this structure reference may be had to co-pending application Serial No. 189,045, filed April 20, 1962, which is a division of the above referred to co-pending application Serial No. 25,428.

The unit 32 is mounted in a frame 37 by means of U-bolts 38. The frame includes a front plate 39, a back plate 40, and side plates 41. The upper part of the unit is enclosed by cover 42. The front plate carries a forwardly projecting yoke 43 in which a fork 44 is swivelly mounted. Wheel 45 is journalled in the fork. The rear plate 40 has spaced handles 46 welded to it. The handles are drilled to provide openings to receive an axle 47 carrying wheels 48.

Handles 46 carry hand grips 49 at their upper ends, and they are bridged at the top by a control box 50. The control box contains the control valves 51 for operating the cylinder unit 32. Hose lines 52 from the unit to the control valves are carried through the handles 46.

At the top of the operating unit 32, there is a guide plate 53. This plate is of sufficient size to project beyond the unit and frame, so that the side edges of the plate extend outward free of the remaining structure. The plate has slots 54 in the projecting sides in which rollers 55 are mounted. These are rotatably held in the slots by bolts 56. The rollers are larger than the thickness of the plate so that a portion of their rolling surfaces project above and below the plate.

At the rear of the plate 53 there are brackets 57 which carry small air cylinders 58. Lock pins 59 are mounted on the ends of piston rods 60 of the cylinder assemblies, and project through guides 61 on brackets 57. Coil springs 62 surround the pins and bear against flanges 63 on the pins and the guides 61 to urge the pins and piston rods to retracted position. The cylinders are connected to a nipple 64 mounted on one handle 46, to which an air line can be connected, as will be described.

When the loader is in place in the stand, a hose line 65, coupled to an air line 66 secured along the side of the stand, is connected to nipple 64. The line 66 will be permanently connected to a source of air under pressure and the hose line 65 carries an automatic cut-off coupling 67 which is opened when connected to nipple 64 of the loader.

In using the apparatus, a matrix is placed upon the stand with its studs 13 in either the openings 15 or 16, depending upon the matrix size. The matrix will be connected to a source of energy, usually to an electric outlet, so that it will be heated. When a tire is to be placed in the matrix, the matrix top plate, or flange, will be removed as is well understood.

An operator will roll the loader to the stand, and, by downward pressure on the hand grips 49, will lift the front end of the loader and consequently raise the front edge of the guide plate 53. This will position the leading edge of the guide plate within the flared end portions 19 of the guide tracks 7, at the open end 6 of the matrix support bed. Rollers 55 will ride on the bottom flanges of the tracks to reduce friction. As the loader is pushed into the stand, rollers 55 will ride up the incline of the flared ends of the tracks so that the loader will be lifted from the floor and suspended from the stand. The leading edge of plate 53 will ride under the declining edges 21 of the hold-down plates 20, so that the plate will be drawn down to a horizontal position between the horizontal lower edges 22 of the hold-down members and the track bottom flanges. The loader can be moved inwardly until the leading edge of plate 53 seats within notches 24 of the stop plates 23. This accomplishes two purposes, it stops the loader so that it is precisely centered beneath the matrix, and it provides means to hold the front edge of the guide plate from lifting during loading or unloading a tire. As soon as the loader strikes the stop plates, hose 65 is coupled to nipple 64. Air cylinders 58 are immediately operative, and lock pins 59 will enter openings 27 in lock plates 25 to hold the loader in proper position on the stand.

The operating unit 32 will be controlled, as set out in detail in application Serial No. 189,045, by manipulation of valves 51 to cause the bead wheels 33 and 34 to rise through the center of the matrix to a level above the matrix and to separate. The top bead wheel 34 is removed, and a tire having its new layer of rubber will be seated on the bottom bead wheel. The tire will contain the usual air bag and back-up rim. The top bead wheel 34, which was removed before the loader was moved into the stand, will be replaced, and drawn down to draw the tire beads toward one another to reduce the tire diameter. With the tire in this condition the entire unit will be lowered to bring the tire into place in the matrix. The beads will be released by raising the upper bead wheel to allow the tire to seat in the matrix. After removing the upper bead wheel, the assembly can be lowered and the loader removed from the stand. As soon as the air hose 65 is uncoupled, lock pins 59 will retract under influence of springs 62 to release the loader for removal.

It will be apparent that the loader will be free for use with other stands. When a tire has cured in a matrix, it can be removed by again joining the loader and stand. The tire is removed by a reversal of the steps used in loading. As the loader is held against movement relative to the stand, any force may be exerted which may be required in drawing a tire into a matrix, or ejecting it therefrom.

Figure 8:
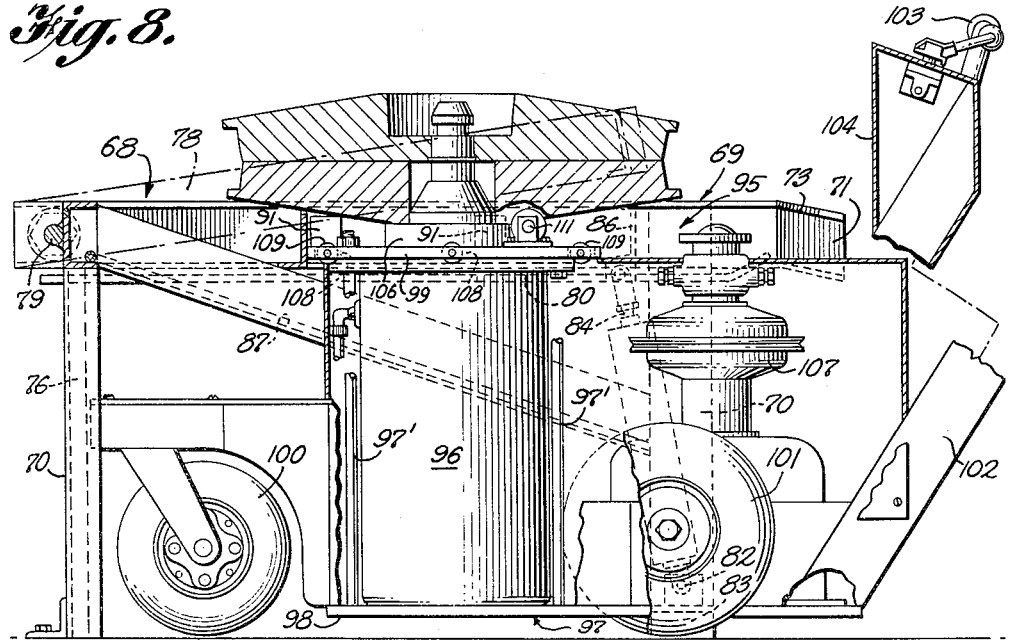
FIGURE 8 is a vertical section taken on the line 8—8 of FIGURE 7.
Figure 9:
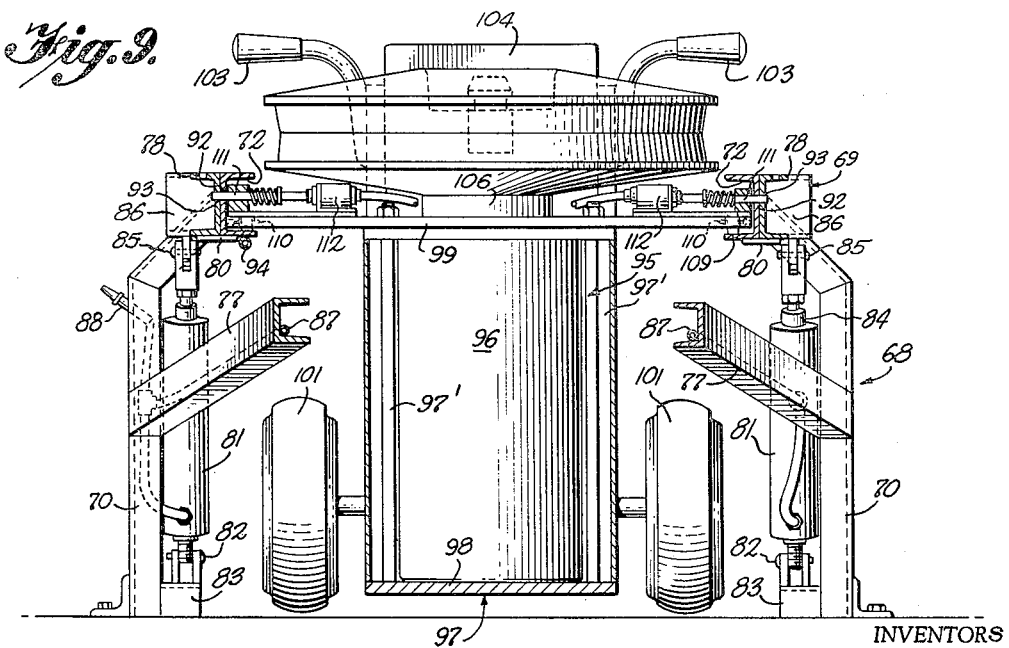
FIGURE 9 is a vertical transverse section through the apparatus shown in FIGURE 7 and is taken on the line 9—9 of FIGURE 7.

For large, heavy tires, such as truck tires, somewhat modified apparatus (shown in FIGURES 7 to 9) will give better results. The basic combination of stand and loader, with the loader being guided into, and locked in place in, the stand is present in the truck equipment.

The truck stand 68 has a matrix bed 69, supported on legs 70. The bed has an open front 71, and is formed of spaced guide track channels 72 having flared ends 73, joined at the back by members 74 and 75. Braces 76 and 77 are used as before.

Stand 68 has a pair of lift bars 78 lying beside the track channels 72, and pivoted at their back ends to a pivot rod 79, fixed to the back member 75. The front ends of the bars seat upon ledges 80 projecting from beneath the guide tracks. Lift bars 78 are vertically movable about the pivot rod 79 by means of air cylinders 81, having the bottom of the cylinders pivotally connected at 82 to cylinder mounts 83 fixed to the bottoms of the front legs. Piston rods 84 of the cylinder assemblies are pivotally connected at 85 to extensions 86 of the lift bars. The cylinders are connected to an air line 87 having a nipple 88 for connection to an air supply.

Lift bars 78 have two sets of openings 89 and 90 to receive the matrix studs to position the matrix. It will be evident that when the cylinders 81 are actuated the lift bars will rise carrying the matrix with them.

The loader is stopped in this form of stand by contact with the back member 74. It is not as essential that the loader be precisely centered with respect to the matrix when handling truck tires as is the case with passenger tires, so no adjustment of the stop is required. Two hold-down plates 91 are fixed to the inner vertical wall of each guide track channel 72 to hold the loader against vertical movement.

No lock plate is provided for the truck stand, but the channels have lock pin openings 92 and the lift bars 78 have similar openings 93 which are axially aligned with the openings 92 when the lift bars are resting upon ledges 80. Thus, the loader can be locked in place and the lift bars held stationary by means of the same lock pins.

An air line 94 is mounted along the side of the stand in the same manner as in the passenger tire stand, and is permanently connected to an air supply source.

The loader 95 used with the truck type stand is very similar to that previously described. It has an operating unit 96 held in a frame 97 by tie down rods 97'. The rods extend from a frame bottom plate 98 to the guide plate 99. A caster wheel 100 and mounting yoke are carried at the front of the frame and wheels 101 are mounted at the rear. Handles 102, with hand grips 103, extend upwardly from the back end of the frame bottom plate. A control box 104 with valves 105 controlling the operating unit 96 is at the top of the handles.

In this embodiment of the loader, the compressing of the tire beads is accomplished by operating the upper cylinder 106 of the unit 96 hydraulically by means of an air driven pump 107. This is not important to the present invention, however.

The guide plate 99 is slotted at 108, to receive rollers 109, mounted on bolts 110. It will be noted that six rollers are used here while but four were used on the previously described loader.

Two lock pins 111 are employed, and they are mounted on each side of the guide plate 99 to position them for entry into the openings 92 and 93 in the stand guide tracks and lift bars. The locking pins are operated by air cylinders 112. The cylinders, as well as the other air-operated members of the device, are connected to nipple 113, so that they may be connected to the stand air line nipple 94' by hose 114.

In using the truck type apparatus, the loader is moved to the stand and the guide plate will be moved into the guide tracks as before. However, before moving the loader into the stand, air hose 114 is connected to nipple 88. This operates cylinders 81, causing the lift bars to rise and tilting up the front end of the matrix. This is required because the heavier truck tires necessitate an elongated loader assembly which would not slip under the matrix in its lowered position. When the loader is in place in the stand with the leading edge of the guide plate 99 against back member 74, air hose 44 is removed from nipple 88 to allow the lift bars to return to rest upon ledges 80. This will move the matrix down over the loader bead wheels. Air hose 114 will be connected to nipple 113 and the lock pins will extend through the aligned openings 92 and 93 to lock the loader in position and the lift bars upon the ledges 80.

The loader will be operated to load and unload the matrix in the same manner as with the passenger tire type.

While in the above, practical embodiments of the invention have been disclosed, the details of construction shown and described are merely by way of illustration, and the invention may take other forms within the scope of the appended claims.

What is claimed is:

1. Apparatus for supporting, loading and unloading tire retreading matrices comprising, a stand having a matrix supporting bed thereon, guide tracks on the stand parallel to the supporting bed and having inclined entrance ends, a wheeled portable matrix loader having operating means to engage and move the beads of a tire axially of the tire to reduce the tire diameter and to move a tire into and eject it from a matrix seated on the matrix supporting bed of the stand, guide means on the loader movable into and along the guide tracks on the stand to raise the loader from the floor and suspend it from the stand, and cooperating means on the stand and loader to hold the loader against movement relative to the stand.

2. Apparatus for supporting, loading and unloading tire retreading matrices as claimed in claim 1 wherein, the stand has means to fix the position of a matrix relative to the matrix supporting bed of the stand, and the stand has means to fix the position of the loader relative to the stand and axially aligned with a matrix on the matrix supporting bed of the stand.

3. Apparatus for supporting, loading and unloading tire matrices as claimed in claim 1 wherein, the stand has means to fix the position of a matrix relative to the matrix supporting bed of the stand and to which a matrix can be secured to hold the matrix against movement vertically of the supporting bed.

4. Apparatus for supporting, loading and unloading tire retreading matrices as claimed in claim 1, wherein the cooperating means on the stand and loader consists of a locking pin and means engageable by the locking pin.

5. Apparatus for supporting, loading and unloading tire retreading matrices as claimed in claim 1 wherein, there are anti-friction devices operable between the guide tracks of the stand and the guide means of the loader.

6. Apparatus for supporting, loading and unloading tire retreading matrices as claimed in claim 1 wherein, the operating means of the loader is fluid-operated, the stand has a fluid conduit for connection to a source of fluid supply, and means on the loader to couple to the fluid conduit of the stand.

7. Apparatus for supporting, loading and unloading tire matrices as claimed in claim 6 wherein, the cooperating means on the stand and loader to hold the loader against movement relative to the stand is fluid operated and automatically operable to cooperating holding position upon connection of the means on the loader to couple to the fluid conduit of the stand to said fluid conduit.

8. Apparatus for supporting, loading and unloading tire retreading matrices comprising, separable stand and portable loader units, the stand having a matrix supporting bed thereon, legs mounting the supporting bed, guide tracks parallel to the supporting bed, and means on the supporting bed to locate a matrix in predetermined relation thereon, the loader having operating means to engage and move the beads of a tire axially of the tire to reduce the tire diameter and to move a tire into and eject it from a matrix on the supporting bed of the stand, wheels mounting the loader, guide means on the loader movable into and along the guide tracks of the stand to lift the loader wheels from the floor and suspend the loader from the stand tracks, means on the stand to locate the loader in predetermined relation thereto to align the loader and a matrix on the supporting bed of the stand in loading position, and means to lock the loader in predetermined location on the stand.

9. Apparatus for supporting, loading and unloading tire retreading matrices as claimed in claim 8 wherein, the guide means on the loader is a guide plate mounted on the operating means, and rollers mounted in the guide plate projecting above and below the guide plate for rolling engagement with the guide track of the stand.

10. Apparatus for supporting, loading and unloading tire retreading matrices as claimed in claim 9 wherein, there are means along the stand guide tracks to engage the upper surface of the loader guide plate to hold the plate and loader against vertical movement relative to the stand.

11. Apparatus for supporting, loading and unloading tire retreading matrices as claimed in claim 8 wherein, the means to lock the loader comprises a locking pin and pin keeper on the loader and stand.

12. Apparatus for supporting, loading and unloading tire retreading matrices comprising, separable stand and portable loader units, the stand having a matrix supporting bed mounted upon legs, the supporting bed having fixed members containing guide tracks and lifting bars pivoted at one end to the fixed members, means carried by the fixed members to provide seats for the ends of the lifting bars remote from the pivot, means on the lifting bars to hold matrices in fixed predetermined position thereon, and means to raise the ends of the lifting bars remote from the pivot, the loader having operating means to engage and move the beads of a tire axially of the tire to reduce the tire diameter and to move a tire into and eject it from a matrix on the supporting bed of the stand, wheels mounting the loader, guide means on the loader movable into and along the guide tracks of the stand to lift the loader wheels from the floor and suspend the loader from the guide tracks, means on the stand to locate the loader in predetermined relation thereto to align the loader and a matrix on the supporting bed of the stand in loading position, and means to lock the loader in predetermined location on the stand and the lifting bars to the fixed members of the stand supporting bed.

13. Apparatus for supporting, loading and unloading tire retreading matrices as claimed in claim 12 wherein, there are means along the guide tracks to engage the guide means on the loader, to hold the loader against vertical movement relative to the stand.

14. Apparatus for supporting, loading and unloading tire retreading matrices comprising, separable stand and portable loader units, the stand having a matrix supporting bed mounted on legs, means forming guide tracks on the stand, the loader having operating means to engage and move tire beads axially of the tire to reduce the tire diameter and to move a tire into and eject it from a matrix on the supporting means of the stand, wheels mounting the loader, guide means on the loader movable into and along the guide track of the stand to lift the loader from the floor and suspend it from the guide track, means on the stand movable vertically to raise a matrix from the supporting bed, means to lock the vertically movable means in lowered position, and means to lock the loader against movement relative to the stand.

References Cited in the file of this patent

UNITED STATES PATENTS

| | | |
|---|---|---|
| 2,928,119 | Fassero et al. | Mar. 15, 1960 |
| 2,948,924 | Clapp | Aug. 16, 1960 |
| 2,987,770 | Powell | June 13, 1961 |
| 3,015,130 | Voth | Jan. 2, 1962 |
| 3,067,457 | Dennis et al. | Dec. 11, 1962 |
| 3,074,109 | Duerksen | Jan. 22, 1963 |